United States Patent
Lindsey et al.

(10) Patent No.: US 12,310,535 B2
(45) Date of Patent: May 27, 2025

(54) FORMULATION AND DISPENSER SYSTEMS FOR BEVERAGE FOAM TOPPINGS

(71) Applicant: Conagra Foods RDM, Inc., Chicago, IL (US)

(72) Inventors: Samantha Lindsey, Omaha, NE (US); Steven R. Baker, Omaha, NE (US)

(73) Assignee: Conagra Foods RDM, Inc., Chicago, IL (US)

( * ) Notice: Subject to any disclaimer, the term of this patent is extended or adjusted under 35 U.S.C. 154(b) by 0 days.

(21) Appl. No.: 18/471,606

(22) Filed: Sep. 21, 2023

(65) Prior Publication Data

US 2024/0188760 A1   Jun. 13, 2024

Related U.S. Application Data

(63) Continuation of application No. 17/673,889, filed on Feb. 17, 2022, now Pat. No. 11,793,358, which is a continuation of application No. 16/790,843, filed on Feb. 14, 2020, now Pat. No. 11,253,107.

(60) Provisional application No. 62/805,520, filed on Feb. 14, 2019.

(51) Int. Cl.
    *A47J 43/12*   (2006.01)
    *B05B 7/00*    (2006.01)
    *B65D 83/16*   (2006.01)
    *B65D 83/30*   (2025.01)

(52) U.S. Cl.
    CPC ............ *A47J 43/12* (2013.01); *B05B 7/0012* (2013.01); *B05B 7/0018* (2013.01); *B65D 83/16* (2013.01); *B65D 83/164* (2025.01); *B65D 83/306* (2013.01)

(58) Field of Classification Search
    CPC ............................. A47J 43/12; A47J 43/128
    See application file for complete search history.

(56) References Cited

U.S. PATENT DOCUMENTS

| | | | | | |
|---|---|---|---|---|---|
| 2,863,699 | A | * | 12/1958 | Elser | B65D 83/205 |
| | | | | | 222/514 |
| 3,954,208 | A | * | 5/1976 | Brill | B65D 83/46 |
| | | | | | 251/249 |
| 4,889,709 | A | * | 12/1989 | Mackles | A61K 9/0056 |
| | | | | | 516/18 |
| 2003/0006252 | A1 | * | 1/2003 | Henry | B65D 83/30 |
| | | | | | 222/402.1 |
| 2010/0062096 | A1 | * | 3/2010 | Clauwaert | B65D 83/30 |
| | | | | | 222/402.1 |

* cited by examiner

*Primary Examiner* — Paul R Durand
*Assistant Examiner* — Michael J. Melaragno
(74) *Attorney, Agent, or Firm* — Ryan T. Grace; Advent, LLP (57) ABSTRACT

Formulation and dispenser systems create dairy based toppings for beverages. The dispensers include a container, valve, and an actuator for the valve. The formulations include a liquid product and a propellant. The liquid product includes a certain percentage of milkfat provided, for example, by heavy cream, skim milk, nonfat dry milk, sweeteners, and an emulsifier. The propellant is nitrous oxide or nitrogen.

20 Claims, 7 Drawing Sheets

FORMULATION AND DISPENSER SYSTEMS FOR BEVERAGE FOAM TOPPINGS

BACKGROUND

Whipped dairy toppings are typically high in fat, thick, stabilized with emulsifiers and gum additives such as sorbitan monostearates or mono or diglycerides. Generally, these are thick whipped toppings that are structurally strong enough to stand up in a rosette shape. Such toppings can be dispensed from aerosol whipped cream dispensers utilizing tilt valves and nitrous oxide as a propellant.

SUMMARY

This summary is provided solely as an introduction to subject matter that is fully described in the detailed description and drawings. The summary should not be considered to describe essential features nor be used to determine the scope of the claims. Moreover, it is to be understood that both the summary and the detailed description are examples and explanatory only and are not necessarily restrictive of the subject matter claimed.

Systems that include a combination of a dispenser and a dairy based formulation are disclosed. The systems produce foams with a density and stability for use with beverages. The systems include a valve actuator employed on an aerosol container which contains the dairy based formulation as a liquid product and a propellant. The propellent can include nitrogen or nitrous oxide. The liquid product includes milkfat at a certain percentage, which can be supplied by, for example, heavy cream, whole milk, half and half, or low fat milk. The liquid product can include other ingredients such as skim milk, nonfat dry milk, sweetener, and lecithin. In one aspect an actuator has a generally cylindrical body with a generally uniform inner diameter. The generally cylindrical body terminates at a cylindrical edge portion. In another aspect an actuator produces a rosette shaped foam.

BRIEF DESCRIPTION OF THE DRAWINGS

The detailed description is described with reference to the accompanying figures. The use of the same reference numbers in different instances in the description and the figures can indicate similar or identical items. Various embodiments or examples ("examples") of the present disclosure are disclosed in the following detailed description and the accompanying drawings. The drawings are not necessarily to scale. In general, operations of disclosed processes can be performed in an arbitrary order, unless otherwise provided in the claims.

DETAILED DESCRIPTION

The present disclosure addresses certain issues of the prior art by providing systems that include combinations of aerosol can actuator valves and formulations. The systems include combinations of components that produce foams with a density and stability for use with beverages. A disclosed cylindrical valve actuator provides a smooth dispensing channel that minimizes any disruption of the foam as it is being dispensed. It has been found, in one aspect, that the combinations of the cylindrical valve actuator and the formulations produce foams with a density and stability for use with beverages.

As an example, the systems described herein are designed for use with dairy blends having certain formulations and designed to be dispensed into or onto hot or cold beverages to create a sit-on-top foam layer topping or an immediately mixing swirling topping. The toppings are not "whipped" as for prior art whipped dairy toppings which are typically high in fat, thick, and stabilized with emulsifiers and gum additives such as sorbitan monostearates or mono or diglycerides.

A cappuccino is a coffee-based beverage that includes espresso topped with foamed milk, and typically includes steamed milk. A latte is a coffee-based beverage that includes espresso mixed with steamed milk. Many coffee shops prepare variations of these drinks, including macchiatos, which include milk foam only. While aspects of the disclosure are described primarily in reference to making espresso-based beverages, it should be understood that the formulations and dispensers can be used to provide a dairy based topping to any beverage, or even to a food product.

In one aspect, a formulation is a combination of a propellant and a dairy blend liquid product designed to be dispensed onto a hot or cold beverage from a container fitted with an actuator as a foamed topping and sit on top of the beverage for an amount of time so that the foam layer can be consumed simultaneously with the lower beverage. For example, the foaming dairy blend dispensed onto a cup of coffee would resemble a cappuccino or a macchiato.

In another aspect, a formulation is a combination of a propellant and a dairy blend liquid product designed to be dispensed onto a hot or cold beverage from a container fitted with an actuator where it immediately mixes with the beverage in a swirl pattern. It can also create a small foam layer on top of the beverage.

Dispensers

Figure 1:
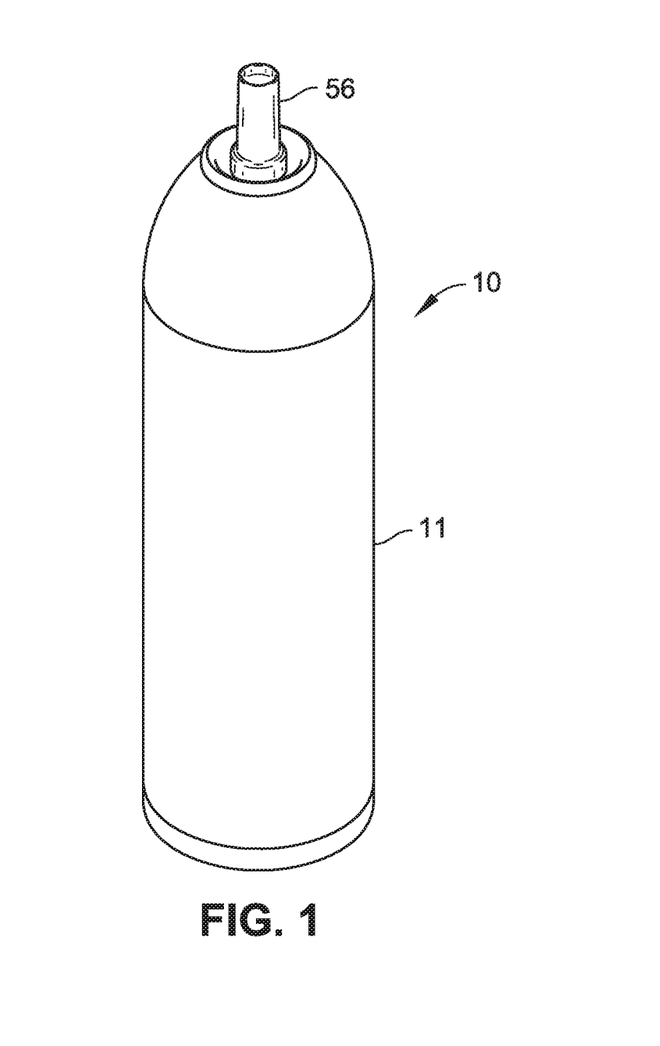
FIG. 1 is a perspective view of an aerosol container having a valve actuator.
Figure 2:
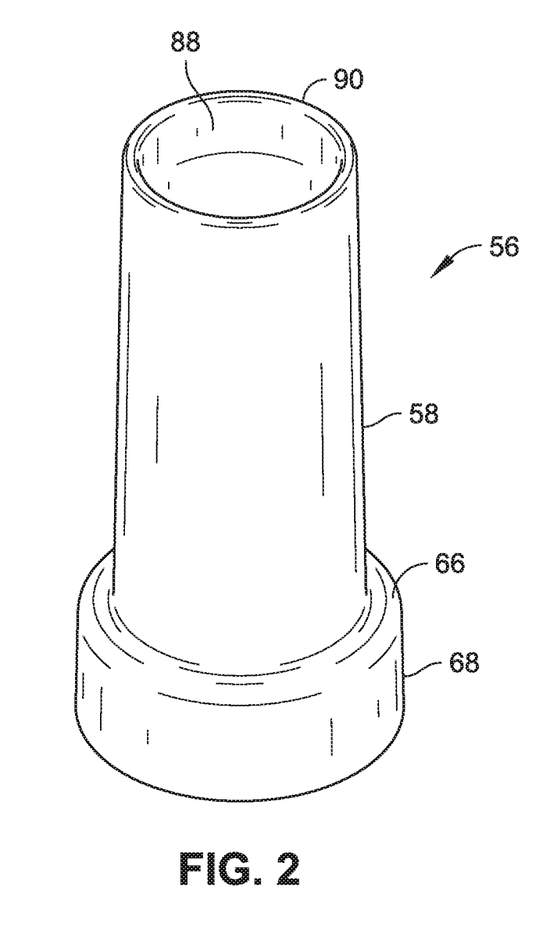
FIG. 2 is a perspective view of a valve actuator for an aerosol container.

FIG. 1 illustrates an aerosol container 10 having a body 11 and valve actuator 56. FIG. 2 shows the valve actuator 56 as including a generally cylindrical body 58 having a generally uniform diameter, an upper or discharge end 88, and a lower or base end. The discharge end of the actuator includes a cylindrical edge portion 90. At the base end, the actuator is formed with an outwardly extending flange 66 and a downwardly extending skirt 68. The underside of the flange 66 is provided with a downwardly facing annular stop shoulder 70 (shown in FIG. 3). Valve actuator 56 can be attached to the valve assembly 15 and body 11 of aerosol container 10 as described below.

Figure 3:
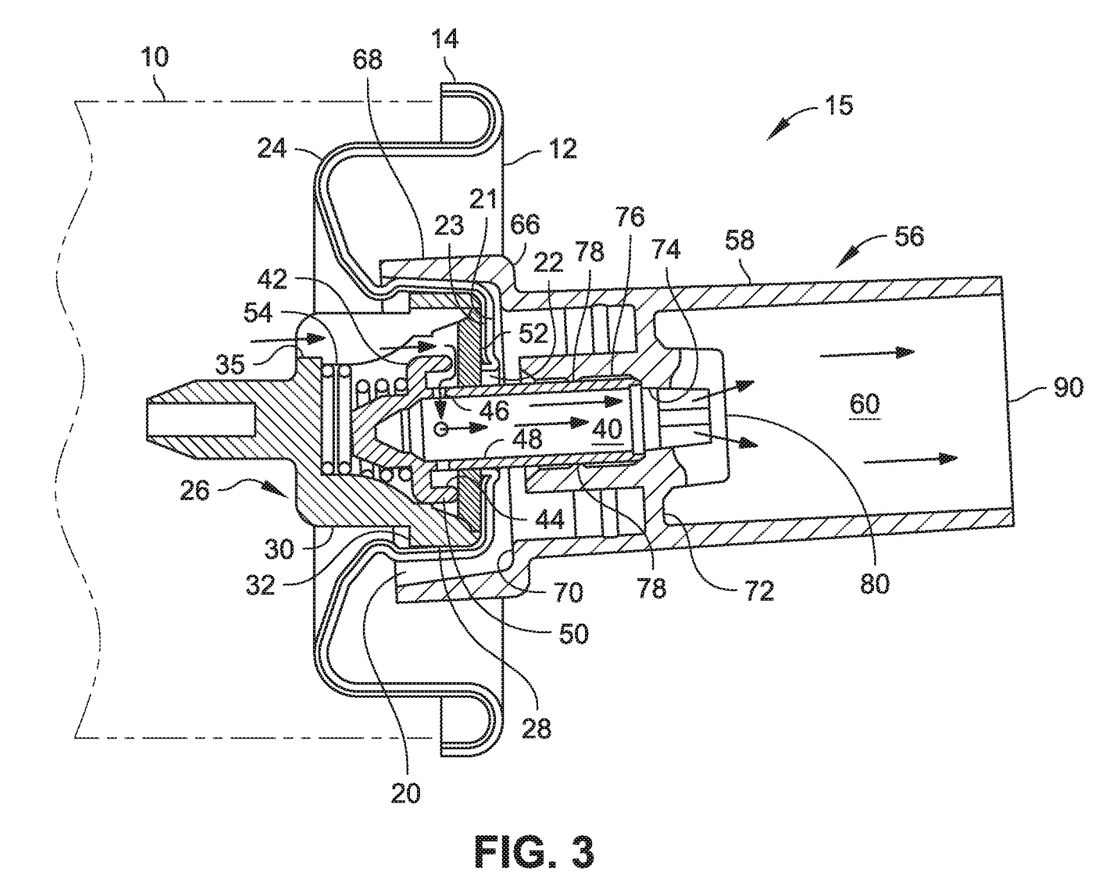
FIG. 3 is a cross sectional view of a tilt valve assembly for use on an aerosol container.

A tilt valve assembly 15, including actuator 56, is shown in detail in FIG. 3. The valve assembly 15 comprises generally a mounting cup 12, a valve body 26, a valve stem 40, a sealing gasket 52, and a biasing element 54 which can be a spring. The mounting cup 12 is of generally circular configuration and includes a peripheral lip 14, by which the cup is mounted on top of aerosol container 10. Centrally formed within the cup is a pedestal 20. The pedestal includes a top 21 having a central stem opening 22. The mounting cup can have a protective sealing laminate 24 on a surface facing the interior of the aerosol container. The mounting cup can be made of metal.

Figure 4:
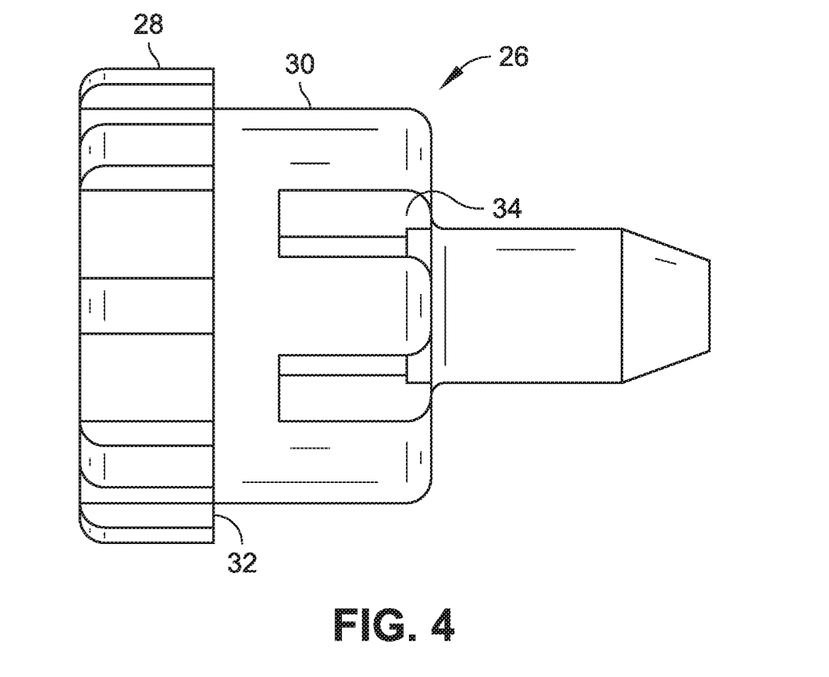
FIG. 4 is a side view of a slotted valve body in accordance with the present disclosure.
Figure 5:
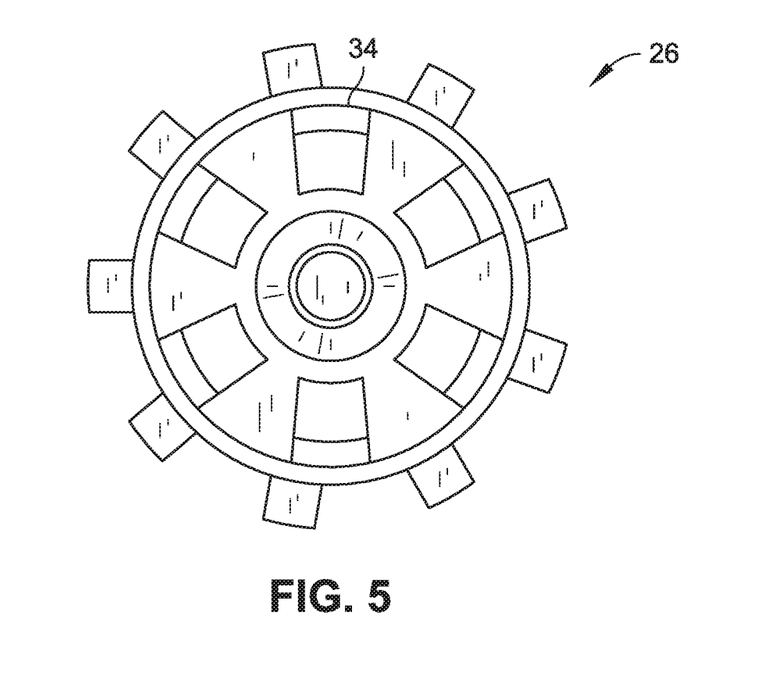
FIG. 5 is a bottom view of the slotted valve body shown in FIG. 4.
Figure 6:
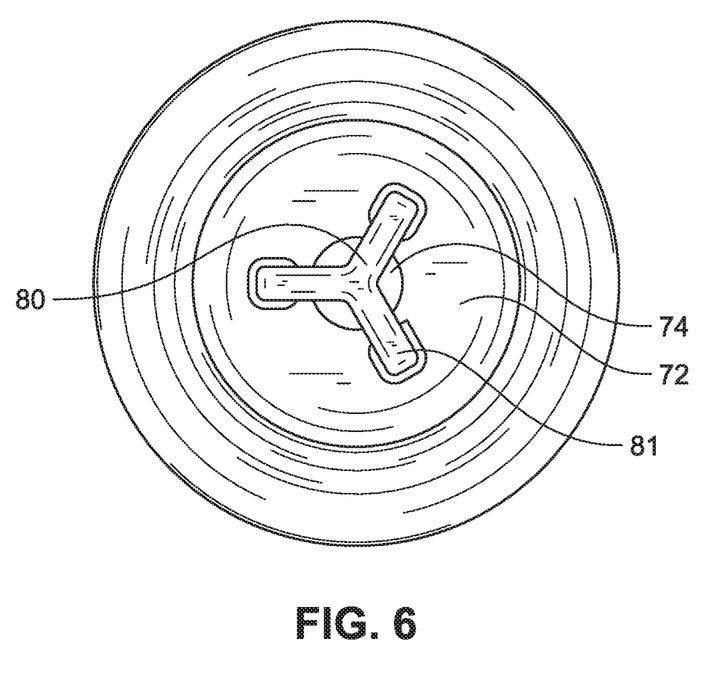
FIG. 6 is a top view of a valve actuator having a flow deflector.

The valve assembly 15 also includes a valve body 26 which has an upper portion 28 and lower slotted portion 30. The valve body 26 is securely attached to the mounting cup 12 by crimping the mounting cup along a surface 32 on the valve body 26 formed at the junction of the upper and lower valve body portions. Referring to FIGS. 4 and 5, the lower valve body portion 30 further includes a plurality of equally spaced slots 34, the slots being of predetermined length and width. The slots are disposed inside the aerosol container 10 and provide a large surface area through which the mixture of product/propellant can enter the valve assembly 15. The valve body 26 can have six equally spaced slots 34 as shown in FIG. 5 but the number of slots can vary.

Referring again to FIG. 3, the valve assembly 15 also includes a valve stem 40 which comprises a hollow cylindrical stem element 48, and a sealing ring 42, which includes an annular lip 44. The valve stem 40 further includes a plurality of metering orifices 46 which are formed into the stem element 48 adjacent the junction of the stem element 48 and the sealing ring 42 and below an upper edge 50 of the annular lip 44. The stem element 48 can include four metering orifices. However, the number and the shape and/or size of the metering orifices can vary depending upon the viscosity of the product to be dispensed from the aerosol container 10. The valve stem 40 and the valve body 26 can be formed from an inert, nontoxic, plastic material, such as polypropylene.

As can be seen in FIG. 3, an elastomeric gasket 52 is disposed between an undersurface 23 of the top 21 of the pedestal 20 and the annular lip 44 of the valve stem 40. The gasket 52, among other functions, serves to close out and seal against fluid leaks along the open upper portion 28 of the valve body 26. Disposed through the center of the gasket 52 is the stem element 48 of the valve stem 40. The gasket 52 forms a fluid tight seal around the perimeter of the stem element 48 sufficient to prevent pressurized product/propellant from escaping along the exterior of the valve stem 40. Disposed between the sealing ring 42 of the valve stem 40 and a base 35 of the valve body 26 is a biasing element 54. The biasing element 54 biases the upper edge 50 of the annular lip 44 of the valve stem 40 upwardly so that the lip 44 makes full peripheral contact against the gasket 52, thereby sealing off and preventing the product/propellant mixture from escaping from the aerosol container 10, via the metering orifices 46 in the valve stem 40. Thus, the biasing element 54 functions to keep the valve assembly 15 in a vertically directed or normally closed position. The biasing element 54 can be a compression spring in the form of a coil wound about an axis coincident with the longitudinal axis of the valve stem 40.

Valve actuator 56 is shown in FIG. 2 and generally described above. As shown in FIG. 3 when attached to aerosol container 10 and valve assembly 15, the inside of the skirt 68 of actuator 56 generally conforms to the shape of the mounting cup pedestal 20. When the actuator is placed over the mounting cup pedestal 20, the skirt 68 extends downwardly to cover most of the pedestal 20 creating a pleasing aesthetic appearance.

Intermediate the upper and lower ends of the actuator 56 is a transverse support partition 72. Extending downwardly from the support partition is a generally centrally aligned nipple 76, which slidably fits over the stem element 48. The nipple 76 and the stem element 48 can be fitted with retaining means such as ribs 78, located on the inside circumference of the nipple 76 and outer circumference of the stem element 48 respectively. When pressed together the rib 78 on the nipple 76 snaps over the rib 78 on the stem element 48 and thereby locks the actuator 56 to the valve stem 40. Those skilled in the art will understand that various combinations of ribs, or ribs and grooves, or other locking features are possible. Alternatively, a friction fit between the nipple 76 and the stem element 48, or a friction fit between the skirt 68 and the mounting cup pedestal 20, can also be used.

Figure 7:
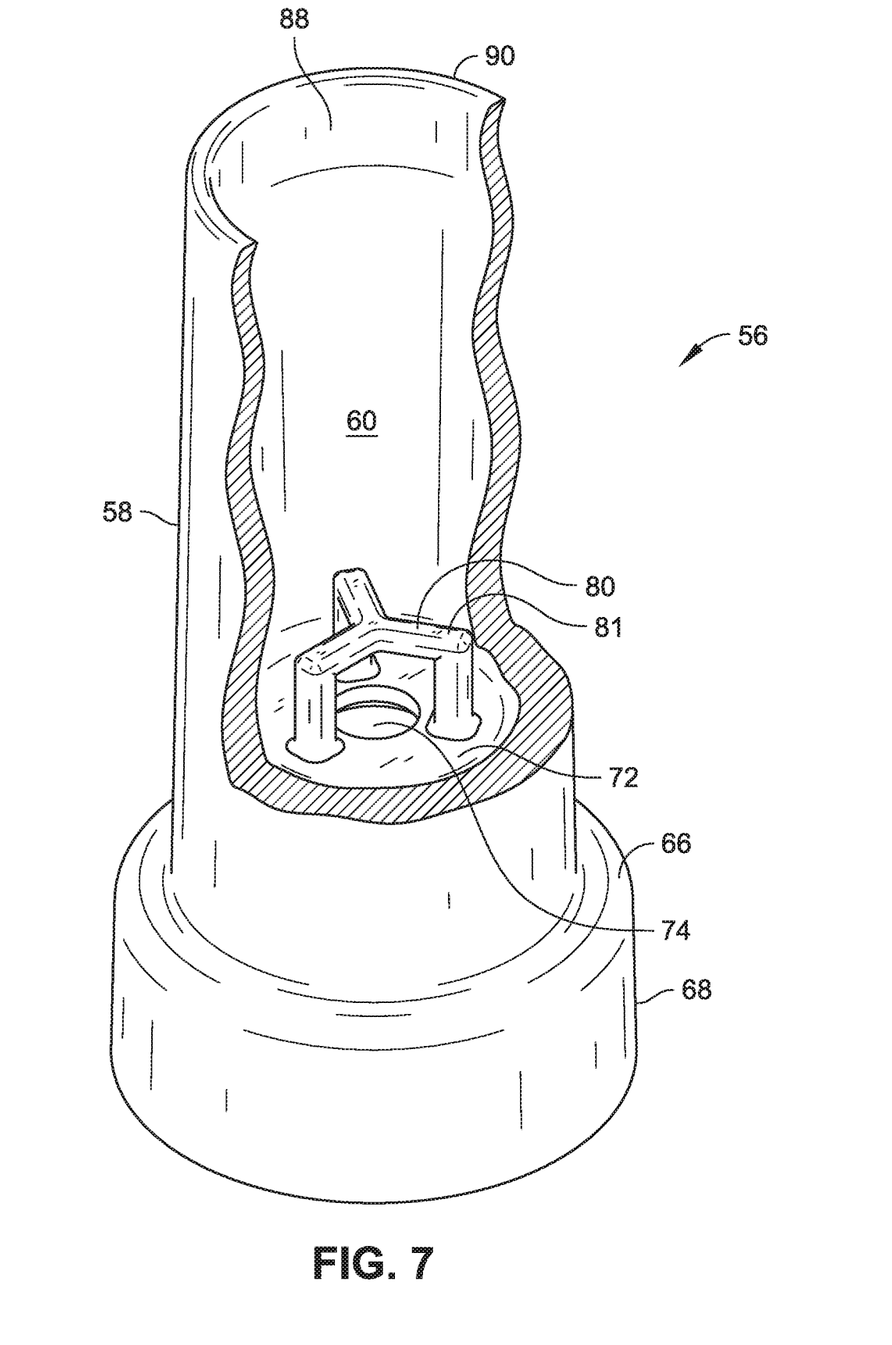
FIG. 7 is a partial cutaway perspective view of a valve actuator showing a flow deflector.

Referring to FIG. 7, defined in the transverse support partition 72 of the actuator 56 is a central passageway 74. A flow deflector 80 is oriented between passageway 74 and cylindrical end portion 90. The flow deflector 80 can have one or more prongs associated with one or more legs 81. The underside of deflector 80 creates an impact surface at a predetermined distance from the passageway 74. The deflector 80 is aligned generally with passageway 74 and functions to promote mixing and foaming of the product/propellant in an expansion chamber 60 which is defined by the interior of the body portion 58 of the actuator 56. It should be noted that the flow deflector 80 rises into and is surrounded by the expansion chamber 60.

Figure 8:
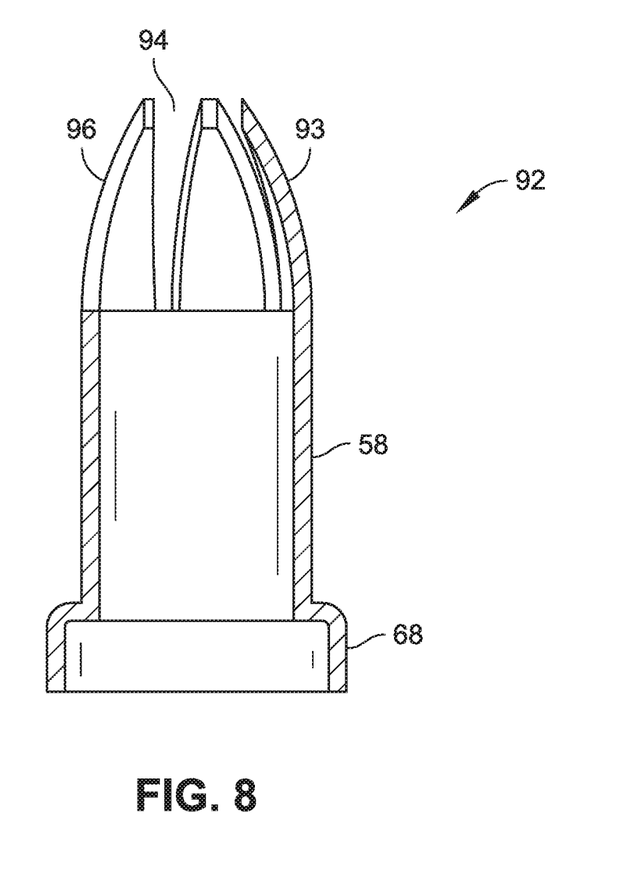
FIG. 8 is a side view of a second valve actuator for an aerosol dispenser.

An alternate actuator 92 is shown in FIG. 8. In this embodiment, the discharge end 93 of the actuator includes a plurality of peripherally spaced slots 94 defining inwardly curved fingers 96. The inwardly curving fingers form what is generally referred to in the art as a "tulip top." The actuator 92 can include, for example, five or six equally spaced fingers. The remainder of the actuator 92 is generally the same as actuator 56.

Figure 9:
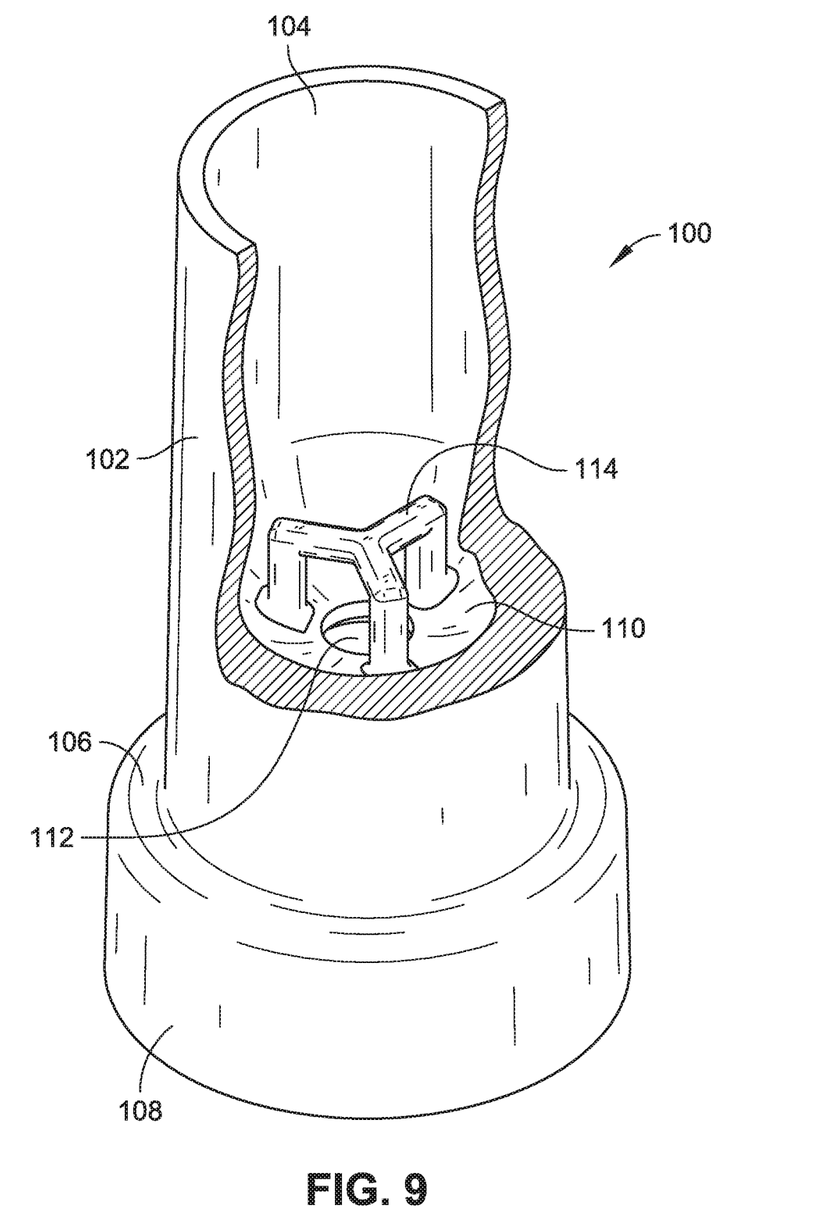
FIG. 9 is a partial cutaway perspective view of a third valve actuator for an aerosol dispenser.

Another alternative actuator 100 is shown in FIG. 9. This actuator includes a generally cylindrical body 102, slightly shorter than that of the actuator shown in FIG. 7, having an upper or discharge end 104 and a lower or base end. The discharge end of the actuator includes a generally flat tip. At the base end, the actuator is formed with an outwardly extending flange 106 and a downwardly extending skirt 108. Intermediate the upper and lower ends of the actuator 100 is a transverse support partition 110 having a tapered central passageway 112 therethrough. The top surface of transverse support partition 110 is concave. Flow deflector 114 is oriented between passageway 112 and discharge end 104.

For use in the systems described herein, aerosol container 10 is equipped with a valve assembly such as valve assembly 15 and actuator 56 (or 92 or 100) and loaded with propellant and a liquid product. A user inverts the container 10 which causes liquid product in the container 10 to enter the valve body 26 through the radially spaced slots 34. The propellant gas inside container 10 is then located above the liquid product.

The user applies a lateral force to the actuator 56 (or 92 or 100), typically using an index finger. The lateral force causes the valve stem 40 to tilt, whereby the sealing ring 42 moves downwardly away from the gasket 52 to form a gap between the ring and the gasket. The gap allows liquid product to enter the stem element 48 of the valve stem 40 via the metering orifices 46. The product passes through the stem element and into the central passageway 74 of the actuator. Upon exiting the central passageway, the liquid product impacts the flow deflector 80 where it is forced past the deflector 80 and into the expansion chamber 60. Mixing of the propellant and liquid product to form a foam begins to occur in the stem element 48 and is substantially complete upon impacting the flow deflector 80. The flow deflector 80 helps to promote uniform mixing and foaming of the propellant/product. The expansion chamber forms the foamed product into its final dispensed shape. The foamed product subsequently exits the actuator from the end 88 (or 93 or 104).

Formulations

Toppings having desired properties were designed using certain dairy liquid product formulations in combination with certain propellants. When dispensed from a dispenser as described above, or as currently known, the result is a foamed topping having desired characteristics.

Nitrous Oxide Propellant

In one aspect, the topping is a foaming dairy blend designed to be dispensed onto a hot or cold beverage and remain on top of the beverage for an amount of time so that the foam layer can be consumed simultaneously with the lower beverage. For example, the foaming dairy blend dispensed onto a cup of coffee would resemble a cappuccino or a macchiato. The optimized formula disclosed here results in a foam that is elastic compared to prior art whipped foams, so that it can be consumed with the beverage and does not float away from the tipped edge of a cup near the consumer's lips. Other foams will be rigid (non-elastic) in a way that causes them to float away to the opposite edge of the cup when tipped to drink, making it impossible to sip two distinct layers simultaneously.

The foaming dairy blend is created from a liquid product and a propellant. The propellant in this embodiment can be nitrous oxide. The amount of propellant can be from about 1.5% to 4.0% by total weight of the formulation. For example, the propellant can be from about 1.5%, 2.0%, 2.5%, 3.0%, 3.5%, 4.0% to about 1.5%, 2.0%, 2.5%, 3.0%, 3.5%, 4.0% by total weight of the formulation.

The liquid product includes one or more dairy products, such as cream, half and half, whole milk, skim milk, and nonfat dry milk. A sweetener can be added, such as, for example, sugar. Flavors such as vanilla can be added and salt can be added. An emulsifying agent can be added to enhance the elasticity of the foam and promote stability and shelf life. The emulsifier can be lecithin, such as soy lecithin. Importantly, the formulations minimize the use of non-clean ingredients such as carrageenan, sorbitan monostearate, and mono and di glycerides, for example.

Total milkfat percentage in the formulations can range from about 0.5 to 18.0% by weight. A desired formulation is 8.25+/−0.65% milkfat. A combination of types of milk can be used to achieve this percentage of milkfat. For example, 9% total milkfat could be achieved using 21.95% by weight heavy cream at 41% milkfat or 50% by weight half and half (18% fat) or 30% by weight of cream (30% fat) or 18.98% heavy cream (41% fat) in conjunction with 50% whole milk (3.25% fat). Other combinations are of course possible.

Reducing the fat percentage too far would not allow for the same foam characteristics or layering effect since the propellant would not be incorporated into the liquid product (as described below). Increasing the fat content considerably would mean that the liquid product is too thick to incorporate gas (as described below) because it would not be free flowing enough.

For example, heavy cream can be used, having about 36% to 41% milkfat for example. The heavy cream is used to add fat, foaming, and flavor to the product. Heavy cream can be from about 0% to about 50% by total weight of the formulation. For example, heavy cream can be from about 0%, 5%, 10%, 15%, 20%, 25%, 30%, 35%, 40%, 50% to about 0%, 5%, 10%, 15%, 20%, 25%, 30%, 35%, 40%, 50% by total weight of the formulation.

Skim milk can be used as the main liquid component although partially skim or whole milk can be used (or a combination). The milk component provides the milk proteins that cause foaming. The skim milk component can be from about 5% to about 98% by total weight of the formulation. For example, the milk component can be from about 5%, 10%, 15%, 20%, 25%, 30%, 35%, 40%, 45%, 50%, 55%, 60%, 65%, 70%, 75%, 80%, 85%, 90%, 95%, 98% to about 5%, 10%, 15%, 20%, 25%, 30%, 35%, 40%, 45%, 50%, 55%, 60%, 65%, 70%, 75%, 80%, 85%, 90%, 95%, 98% by total weight of the formulation. Nonfat dry milk can be added to increase the dairy flavor, add some protein, and add to the stability and texture of the foam. Nonfat dry milk can be from about 0% to about 5.00% by total weight of the formulation. For example, nonfat dry milk can be from about 0%, 0.50%, 1.00%, 1.50%, 2.00%, 2.50%, 3.00%, 3.50%, 4.00%, 4.50%, 5.00% to about 0%, 0.50%, 1.00%, 1.50%, 2.00%, 2.50%, 3.00%, 3.50%, 4.00%, 4.50%, 5.00% by total weight of the formulation. Whey protein concentrates or similar solids such as maltodextrins or gums can be used to provide similar effects.

An emulsifier can be used in the formulation. The emulsifier can be from about 0.5% to about 3.0% by total weight of the formulation. For example, the emulsifier can be from about 0.50%, 0.75%, 1.00%, 1.25%, 1.50%, 1.75%, 2.00%, 2.25%, 2.50%, 2.75%, 3.00% to about 0.50%, 0.75%, 1.00%, 1.25%, 1.50%, 1.75%, 2.00%, 2.25%, 2.50%, 2.75%, 3.00% by total weight of the formulation. An example emulsifier is lecithin. For example, powdered soy lecithin can be used for emulsification and foaming. The emulsifier allows the foam to be elastic/flexible for dispensing, and so that the foam moves with the beverage to be sipped. The emulsifier allows for the foam to melt into the beverage with time and does not add viscosity or gelling. Deoiled, dry lecithin is preferred since it has increased solubility in water. Liquid lecithins could be used as well. Other lecithins could be used if they had similar solubility and foaming capacity, regardless of plant source or liquid/solid state. For example, lecithin from other plant sources, such as sunflower and canola lecithin can be used.

A variety of sweeteners can be added, or no sweetener. The sweetener can be from about 0% to about 45% by total weight of the formulation. For example, the sweetener can be from about 0%, 5%, 10%, 15%, 20%, 25%, 30%, 35%, 40%, 45% to about 0%, 5%, 10%, 15%, 20%, 25%, 30%, 35%, 40%, 45% by total weight of the formulation. One sweetener that can be used is white granulated sugar which, in addition to providing sweetness, strengthens the foam enough that it stays layered for several minutes in hot coffee. If the sugar content is very high, it will form a weak gel to provide additional stabilization of the microbubble foam.

A variety of flavors can be added. The flavoring can be about 0% to about 5% by total weight of the formulation. In addition, salt can be added to the formulation. Salt can be from about 0 to about 0.3% by total weight of the formulation. For example, salt can be from about 0%, 0.1%, 0.2%, 0.3% to about 0%, 0.1%, 0.2%, 0.3% by total weight of the formulation.

The ranges in the formulation indicated in Table 1 produce a foam that sits on top of the beverage for several minutes rather than immediately disseminating into the beverage. Note that the milkfat percentage can be achieved by various combinations of the heavy cream (or using other milkfat containing products as discussed above).

TABLE 1

| Ingredient | % by weight |
| --- | --- |
| MILKFAT | 0.5 to 18.0% |
| CREAM, HEAVY (36% fat) | 0 to 50.0% |
| CREAM, HEAVY (41% fat) | 0 to 43.9% |
| SKIM MILK | 5.0 to 98.0% |
| NONFAT DRY MILK | 0 to 5.0% |
| SUGAR, WHITE, GRANULATED | 0 to 45% |
| SOY, LECITHIN, POWDER | 0.5 to 3.0% |
| FLAVOR, VANILLA | N/A |
| SALT | 0 to 0.3% |

A formulation according to this composition is combined with the propellant nitrous oxide in an aerosol can. Nitrous oxide is very soluble in milkfat so when the can is shaken, gas is incorporated into the fat colloids which have been dispersed into and stabilized by the other ingredients. This results in a protein-stabilized emulsion encapsulating a foam. The density and fat content are important; the product must be fully-flowable to readily mix with the propellant. The fat content and emulsifier content are important because they allow for encapsulation of the nitrous oxide. The density will vary depending on the fat content and total solids and may range from about 0.8 to 1.1 g/ml.

Because the propellant is incorporated into the composition, the product expelled from the aerosol can is a consumer-visible foam. The foam forms from expansion (high pressure-inside of can to low-pressure outside of can) when nitrous oxide is solubilized into the formula. During expulsion, the nitrous oxide dissipates, leaving the foam behind.

The use of the valve actuator described above, having a multi-pronged deflector and a flat tip, creates additional foam which is slow to dispense dependent on the actuator diameter. The resulting foam is free-flowing and elastic, with enough surface tension to sit on top of a beverage, due to the lecithin functionality, fat/nitrous interactions, and sugar stabilization to delay incorporation into the beverage for a few minutes.

Nitrogen Propellant

In another aspect the dairy blend is designed to be dispensed onto a hot or cold beverage where it immediately mixes with the beverage in a swirl pattern. It can also create a small foam layer on top of the beverage. For example, the dairy blend dispensed into a cup of coffee would resemble a latte.

The dairy blend is created from a liquid product and a propellant. The propellant in this embodiment can be nitrogen gas. The amount of propellant ranges from about 0.8% to 1.3% by weight. For example, the propellant can be 0.8%, 0.9%, 1.0%, 1.1%, 1.2%, 1.3% to 0.8%, 0.9%, 1.0%, 1.1%, 1.2%, 1.3%. Using nitrogen gas as the propellant provides the "nitro" effect, dispensing with velocity, where the foamed product will mix with the beverage in a swirling pattern.

The liquid product includes one or more dairy products, such as cream, half and half, whole milk, skim milk, and nonfat dry milk. A sweetener may be added, such as, for example, sugar. Flavors such as vanilla may be added and salt may be added. An emulsifying agent may be added to enhance the elasticity of the foam. In some aspects the emulsifier is lecithin, such as soy lecithin. Importantly, the formulations minimize the use of non-clean ingredients such as carrageenan sorbitan monostearate, and mono and di glycerides, for example.

Milkfat percentage in the formulations can range from about 0 to 30%. A desired formulation is 8.25+/−0.65% milkfat. A combination of types of milk can be used to achieve this percentage of milkfat. For example, 9% total milkfat could be achieved using 21.95% by weight heavy cream at 41% milkfat or 50% by weight half and half (18% fat) or 30% by weight of cream (30% fat) or 18.98% heavy cream (41% fat) in combination with 50% whole milk (3.25% fat). The 0% milkfat formulation could be formulated from a skim milk/high sugar/high lecithin formula.

Reducing the fat percentage too far would not allow for the same characteristics as the product would be too thin and have limited swirling since the density difference between the beverage and the product would be too low. Increasing the fat content considerably would cause the product to dispense poorly, with sputtering.

Heavy cream may be used, having about 41% milkfat for example. The heavy cream is used to add fat, foaming, and flavor to the product. Skim milk may be used as the main liquid component although partially skim or whole milk could be used (or a combination of milk/cream/water). This milk component provides the milk proteins that cause foaming. Nonfat dry milk may be added to increase the dairy flavor and add to the stability and texture of the foam. Whey protein concentrates or similar solids may be used to provide similar effects.

Powdered soy lecithin may be used for emulsification and foaming. It does not add viscosity or gelling. Deoiled, dry lecithin may be used although other types may be used so long as they provide similar effects.

A variety of sweeteners may be added, or no sweetener. One sweetener is white granulated sugar which, in addition to providing sweetness, strengthens the foam. Too much sugar can cause dispensing difficulty and the dispensed product will not stay suspended.

A variety of flavors may be added.

The ranges in the formulation in Table 2 produce a foam that immediately mixes with the beverage in a swirl pattern. It also creates a small foam layer on top of the beverage. For example, the dairy blend dispensed into a cup of coffee would resemble a latte. The liquid product should be thin enough in viscosity to incorporate the propellant prior to dispensing. Note that the milkfat percentage can be achieved by various combinations of the heavy cream (or using other milkfat containing products as discussed above).

TABLE 2

| Ingredient | % by weight |
| --- | --- |
| MILKFAT | 0.25 to 30.0% |
| CREAM, HEAVY (36% fat) | 0 to 83.4% |
| CREAM, HEAVY (41% fat) | 0 to 73.2% |
| SKIM MILK | 5 to 98.0% |
| NONFAT DRY MILK | 0 to 8.0% |
| SUGAR, WHITE, GRANULATED | 0 to 45% |
| SOY, LECITHIN, POWDER | 0.5 to 3.0% |
| FLAVOR, VANILLA | N/A |
| SALT | 0 to 0.3% |

The ranges collectively for the nitrogen product are wider than the ranges for the nitrous oxide product due to the limited liquid-propellant reactions (since nitrogen gas is inert). The ingredient to ingredient interactions are more important to manage than the ingredient to propellant interactions, because the adjustments in formula are less likely to influence ingredient to propellant interactions (and ultimately create undesirable product characteristics). Evacuation and evacuation velocity are the priorities, as propellant to product interactions would be minimal due to nitrogen gas being inert.

A formulation according to this composition is combined with the propellant nitrogen in an aerosol can. Nitrogen gas is not soluble in milkfat so when the can is shaken, gas is not incorporated into the fat colloids which have been dispersed into and stabilized by the other ingredients. Lecithin-trapped microbubbles of nitrogen will form in the base during manual shaking, but will dissociate back to the headspace within a few seconds Because nitrogen is not incorporated into the stabilized emulsion pre-dispense, there is limited surface tension to prevent the creamer from mixing into the beverage. The degree of swirling will be increased as the density or solubility differences between the beverage and creamer increase, generally achieved by increasing fat content. A thin foam layer forms from entrapped microbubbles of air and nitrogen, amplified with the velocity of product hitting the beverage surface. The effect of the actuator valve is minimal for this embodiment so the valve as described above can be used, or a prior art valve.

Aerosol Container

With regards to the aerosol container, for either the nitrous or nitrogen propellant, a two piece steel can, having dimensions 211×604 or 211×713, for example, may be used. The can could be shaped differently or made from a different material but it generally has similar dimensions to hold a similar amount of product (10 to 18 oz, for example).

Important metrics for the assembly include headspace pressure, total propellant added (weight), and the amount of space the propellant can occupy in the container (relative to the amount of liquid product), and processing (inlet pressure, gasser rpm, gasser shake time, propellant temperature, product temperature). The propellant should maintain a pressure high enough to evacuate the product from the container. Nitrous oxide will chemically interact with the base to form a foam, upon shaking and dispensing (with pressure drop). Nitrogen gas will not chemically interact with the liquid product.

EXAMPLES

Example 1—A formulation of a liquid product for use with a nitrous oxide propellant is illustrated by Table 3.

TABLE 3

| Ingredient | % by weight |
| --- | --- |
| CREAM, HEAVY, 41% MILKFAT | 18.9% |
| SKIM MILK, GRADE A, PASTEURIZED | 47.3% |
| NONFAT DRY MILK, LOW HEAT | 0.9% |
| SUGAR, WHITE, GRANULATED | 31.9% |
| SOY LECITHIN POWDER, SPRAY DRIED, NO CARRIERS OR DILUTANTS | 0.8% |
| FLAVOR, VANILLA, NATURAL, LIQUID | 0.2% |
| SALT, GRANULATED, FOOD GRADE | 0.1% |

The liquid product of Table 3 and propellant are included in amounts shown in Table 4.

TABLE 4

| Ingredient | (grams) |
| --- | --- |
| Liquid Product | 366.6 to 370.6<br>368.6 target |

TABLE 4-continued

| Ingredient | (grams) |
| --- | --- |
| Propellant, Nitrous Oxide | 7.5 to 10.7<br>9.1 target<br>135 to 155 psi |

The liquid product and propellant were loaded in metal 2-piece aerosol containers. Pressure at fill ranged from 135-155 psi. A cylindrical actuator, as described above, was utilized. The interior deflector distributed product within the actuator to the outer walls and slows dispensing. The wide-set cylinder shape, which helped prevent the destruction of the foam, allowed for the foam to dispense flat (without a rosette shape of traditional whipped toppings). This product created a foam layer on hot coffee which remained for several minutes.

Example 2—A formulation of a second liquid product for use with nitrogen as a propellant is illustrated by Tables 5 and 6. The liquid product is the same as in Example 1 but the amount of nitrogen propellant is quite different (Table 6).

TABLE 5

| Ingredient | Spec Range (% by weight) |
| --- | --- |
| CREAM, HEAVY, 41% MILKFAT, -NO rBST | 18.9% |
| SKIM MILK, GRADE A, PASTEURIZED, -NO rBST | 47.3% |
| NONFAT DRY MILK, LOW HEAT, -NO rBST | 0.9% |
| SUGAR, WHITE, GRANULATED | 31.9% |
| SOY LECITHIN POWDER, SPRAY DRIED, NO CARRIERS OR DILUTANTS | 0.8% |
| FLAVOR, VANILLA, NATURAL, WONF, LIQUID | 0.2% |
| SALT, GRANULATED, FOOD GRADE | 0.1% |

The liquid product of Table 5 and propellant are included in amounts shown in Table 6.

TABLE 6

| Ingredient | Spec Range (grams) |
| --- | --- |
| Liquid Product | 369.6 to 373.6<br>371.6 target |
| Propellant, Nitrogen gas | 3.0 to 5.6<br>4.3 target<br>135 to 155 psi |

The liquid product and propellant were loaded in an aerosol container and a valve and actuator as described in Example 1 were used for dispensing. This product created a topping which swirled into the hot coffee and created a small foam layer on top.

Modifications and variations of the disclosure will be apparent to those skilled in the art from the forgoing detailed description. All modifications and variations are intended to be encompassed by the following claims. All publications, patents, and patent applications cited herein are hereby incorporated by reference in their entirety.

What is claimed is:

1. A system for dispensing a foamed topping for a beverage to create a foam layer on the top surface of the beverage, the system comprising:
    an aerosol container containing a foaming topping combination, the foaming topping combination including a dairy-based liquid product and a propellant, wherein the propellant includes nitrous oxide;
    a valve attached to the aerosol container; and an actuator for the valve, wherein the actuator includes
- a transverse support partition having a central passageway therethrough and a deflector situated above and aligned with the central passageway, the transverse support partition having an upper concave surface defining the central passageway beneath the deflector, and
- a generally cylindrical body with a generally uniform inner diameter, wherein the cylindrical body terminates at a cylindrical edge portion configured to dispense a foam upon release of the foaming topping combination through the valve without a rosette shape to the foam.

2. The system of claim 1, wherein the propellant is included in an amount from 2.0% to 2.9% by weight of the foaming topping combination.

3. The system of claim 1, wherein the propellant is included in the aerosol container in a pressure from 135 psi to 155 psi.

4. The system of claim 1, wherein the dairy-based liquid product includes milkfat and an emulsifier.

5. The system of claim 4, wherein the dairy-based liquid product includes a sweetener.

6. The system of claim 5, wherein the sweetener includes sugar.

7. The system of claim 5, wherein the sweetener includes granulated sugar.

8. The system of claim 4, wherein the dairy-based liquid product includes salt.

9. The system of claim 4, wherein the dairy-based liquid product includes a flavoring.

10. The system of claim 1, wherein the deflector includes at least one prong.

11. The system of claim 1, wherein the deflector includes a plurality of prongs extending from the upper concave surface.

12. A system for dispensing a topping for a beverage, the system comprising:
- an aerosol container containing a foaming topping combination, the foaming topping combination including a dairy-based liquid product and a propellant,
- wherein the propellent is nitrogen gas;
- a valve attached to the aerosol container; and
- an actuator for the valve, wherein the actuator includes
  - a transverse support partition having a central passageway therethrough and a deflector situated above and aligned with the central passageway, the transverse support partition having an upper concave surface defining the central passageway beneath the deflector, and
  - a generally cylindrical body with a generally uniform inner diameter, wherein the cylindrical body terminates at a cylindrical edge portion configured to dispense a foam upon release of the foaming topping combination through the valve.

13. The system of claim 12, wherein the propellant is included in an amount from 0.8% to 1.3% by weight of the foaming topping combination.

14. The system of claim 12, wherein the propellant is included in the aerosol container in a pressure from 135 psi to 155 psi.

15. The system of claim 12, wherein the dairy-based liquid product includes milkfat and an emulsifier.

16. The system of claim 15, wherein the dairy-based liquid product includes a sweetener.

17. The system of claim 16, wherein the sweetener includes sugar.

18. The system of claim 16, wherein the sweetener includes granulated sugar.

19. The system of claim 12, wherein the deflector includes at least one prong.

20. The system of claim 12, wherein the deflector includes a plurality of prongs extending from the upper concave surface.

* * * * *